United States Patent Office 2,866,708
Patented Dec. 30, 1958

2,866,708

METHOD OF PRESERVING DRESSED POULTRY AND COMPOSITION THEREFOR

Harry P. Broquist, Woodcliff Lake, and Leonard R. Hines, Ridgewood, N. J., and August Richard Kohler, Pearl River, N. Y., assignors to American Cyanamid Company, New York, N. Y., a corporation of Maine No Drawing. Application May 13, 1955
Serial No. 508,296

8 Claims. (Cl. 99—157)

This invention relates to the treatment of dressed poultry. More particularly, the invention relates to the treatment of eviscerated poultry with solutions of antibiotics whereby a prolonged shelf life of the poultry is obtained.

It is customary in the poultry industry to chill freshly killed poultry in an ice-water bath for periods ranging from ½ to 4 hours for the purpose of reducing the temperature of the poultry and to minimize subsequent bacterial growth. The chilled poultry is removed from the ice bath, packaged by conventional methods, and distributed. Unless the poultry is frozen, which may be uneconomical or for other reasons unfeasible, decomposition takes place very quickly, and the meat soon becomes inedible. This short shelf life has been a handicap to the poultry industry and has necessitated many small slaughter houses, which are able to serve only a relatively small area. These small plants are often inefficient, unsanitary, and difficult to control by health authorities. An improvement in the processing of fresh poultry is obviously desirable.

Tarr et al. have employed antibiotics in the preservation of fish, and Deatherage et al. have used antibiotics in the preservation of beef. We have shown in Food Technology, vol. 8, May 1954, page 19, that chlortetracycline is effective in increasing the shelf life of poultry by 7–14 days when freshly killed chickens are dipped in water containing 3–30 parts per million chlortetracycline and subsequently stored at 40° F. The present invention deals with this discovery and improvements in the process, which have been subsequently made, whereby even superior results over those described in the Food Technology article are obtained.

Although we have discovered that the tetracycline antibiotics in general, chlortetracycline, oxytetracycline, and tetracycline are remarkably effective in preserving the flesh of freshly killed poultry, this result is enhanced in a synergistic manner by using mixtures of antibiotic solutions of the type and kind set forth hereinafter.

In carrying out our invention freshly killed poultry, after being cleaned in the customary manner, is immersed in an ice-water bath containing 3–50 parts per million or more of an antibiotic or an antibiotic mixture as will be shown hereinafter. After the flesh has been chilled, it is removed from the antibiotic bath and packaged by conventional methods, after which it may be distributed to the retail markets.

To illustrate the advantages of the present invention, a number of tables will be given to illustrate the effectiveness of the procedure to be described and claimed herein. Quantitatively, the results are expressed in terms of microorganisms per milliliter of solution as determined in the following manner:

The procedure for taking the bacterial counts of poultry is substantially as follows: Each chicken weighing approximately 2¼ pounds is carefully immersed in 1 liter of sterile distilled water for 5 minutes. After that, the chicken is dipped an additional 10 times, allowed to drain, and then discarded. This rinse water now contains most of the surface microorganisms found on the bird. Depending on the amount of spoilage, dilutions of the rinse water are made in sterile distilled water and 1 milliliter of each desired dilution is added to duplicate test tubes of nutrient agar. The tubes are then poured into sterile Petri dishes. When hard, they are inverted and stored at room temperature (24° C.) for 48 hours, after which the individual colonies are counted.

Organoleptic observations are also included in some of these tables.

TABLE I

Comparative effectiveness of tetracycline antibiotics in poultry preservation

| Storage days, 37° F. | Conc. of 30 min. dip, γ/ml. | Microorganisms × 10⁶/ml. Tetracycline Antibiotics | | | |
|---|---|---|---|---|---|
| | | Controls | Chlortetracycline | Tetracycline | Oxytetracycline |
| 0 | 0 | A 0.23 D 3,050.0 | | | |
| 7 | 3 | | A 72.0 | B 1,000.0 | B 1,500.0 |
| | 10 | | A 4.6 | B 53.0 | B 454.0 |
| | 30 | | A 0.13 | A 1.97 | A 5.2 |
| 14 | 0 | E 800.0 | | | |
| | 3 | | A 2,650.0 | C 2,450.0 | C 1,170.0 |
| | 10 | | A 35.5 | B 1,380.0 | C 395.0 |
| | 30 | | A 6.0 | A 325.0 | A 370.0 |
| 21 | 0 | E 325.0 | | | |
| | 3 | | B 2,990.0 | E 1,770.0 | D 1,605.0 |
| | 10 | | C 1,320.0 | C 1,775.0 | C 1,350.0 |
| | 30 | | C 21.0 | B 1,625.0 | B 1,090.0 |

Organoleptic Observations:
A=OK.
B=Very slight odor.
C=Slight odor.
D=Strong odor.
E=Putrid.

As will be seen from the above table, as little as 3 parts per million of each of the tetracycline antibiotics was effective in increasing the shelf life of poultry which had been dipped in the antibiotic-containing solution. Chlortetracycline appeared to have definite advantage over the others.

TABLE II

Effectiveness of chlortetracycline, Neomycin and Polymyxin B in poultry preservation

[Eleven days' storage at 37° F.]

| Antibiotic used—γ/ml. | | | Microorganisms ×10⁶/ml. | Organoleptic Observations |
|---|---|---|---|---|
| Chlortetracycline | Neomycin | Polymyxin B | | |
| | | | 1,050.0 | Putrid. |
| 3 | | | 4.8 | Very slight odor. |
| | 30 | | 28.2 | Do. |
| | | 30 | 10.0 | OK. |
| 3 | 30 | | 0.03 | OK. |
| 3 | | 30 | 0.021 | OK. |
| 3 | 30 | 30 | 0.017 | OK. |

As will be seen from the above table, although chlortetracycline, Neomycin, and Polymyxin B are not particularly effective in extending the shelf life of poultry at the concentrations studied, the remarkable finding was that combinations of chlortetracycline with Neomycin or Polymyxin B were far more effective than the effect of either alone. It will be noticed that 3 parts per million of chlortetracycline were somewhat more effective than 30 parts per million of Neomycin or Polymyxin B.

TABLE III

*Effectiveness of tetracycline, Neomycin and Polymyxin B in poultry preservation*

[Eleven days' storage at 37° F.]

| Antibiotic used—γ/ml. | | | Micro- organisms ×10⁶/ml. | Organoleptic Observations |
|---|---|---|---|---|
| Tetra- cycline | Neomycin | Polymyxin B | | |
| --- | --- | --- | 47.0 | Very slight odor. |
| 3 | --- | --- | 13.5 | OK. |
| --- | 30 | --- | 4.5 | OK. |
| --- | --- | 30 | 3.6 | OK. |
| 3 | 30 | --- | 0.022 | OK. |
| 3 | --- | 30 | 0.01 | OK. |
| 3 | 30 | 30 | 0.006 | OK. |

The above table shows the same type of synergism that is exhibited in Table II when using tetracycline as the antibiotic in place of chlortetracycline. Similar results were found with oxytetracycline in combination with Neomycin or Polymyxin B.

In another series of experiments designed to show the synergistic action of chlortetracycline and Neomycin, poultry was dipped as before in a solution containing 30 p. p. m. of antibiotic or mixed antibiotics and stored for 10 days at 37° F. The bacterial count was as follows:

TABLE IV

| Percentage Antibiotic— 100%—30 p. p. m. | | Bacterial Count× 10⁵/ml. |
|---|---|---|
| Neomycin | Chlortetra- cycline | |
| 0 | 100 | 0.76 |
| 20 | 80 | 0.13 |
| 50 | 50 | 0.21 |
| 80 | 20 | 0.19 |
| 90 | 10 | 3.11 |
| 100 | 0 | 23.0 |

As will be seen from the foregoing table, the synergistic action is evident when 10 to 20 percent of one or the other of the antibiotics is present in the mixture. Other tetracycline-type antibiotics, such as, bromotetracycline may also be used.

In another series of experiments, the synergistic action between broad spectrum antibiotics, such as chlortetracycline and certain other antibiotics effective against gram-negative bacteria, was demonstrated. Equal numbers of poultry spoilage organisms were added to a series of Petri dishes containing nutrient agar and varying levels of antibiotics, Table V. Differences in the number of organisms growing on each plate demonstrates the existence of synergism.

TABLE V

*Antibiotics*

| Aureo- mycin, mcg. | Chloro- mycetin, mcg. | Neo- mycin, mcg. | Magna- mycin, mcg. | Strepto- mycin, mcg. | Poly- myxin B, units | Bacteria 48 Hours Count |
|---|---|---|---|---|---|---|
| 0 | --- | --- | --- | --- | --- | 325 × 10⁶ |
| 10 | --- | --- | --- | --- | --- | 6.5 |
| 20 | --- | --- | --- | --- | --- | 0.79 |
| --- | 10 | --- | --- | --- | --- | 38.5 |
| 10 | 10 | --- | --- | --- | --- | 0.075 |
| --- | --- | 10 | --- | --- | --- | 20.5 |
| 10 | --- | 10 | --- | --- | --- | 0.49 |
| --- | --- | --- | 10 | --- | --- | 21.5 |
| 10 | --- | --- | 10 | --- | --- | 1.2 |
| --- | --- | --- | --- | 10 | --- | 51.0 |
| 10 | --- | --- | --- | 10 | --- | 0.05 |
| --- | --- | --- | --- | --- | 100 | 35.0 |
| 10 | --- | --- | --- | --- | 100 | 3.4 |

Many experiments in addition to those described above have been conducted. It appears that the usefulness of the tetracycline antibiotics is enhanced in a synergistic manner when used with antibiotics particularly effective against gram-negative bacteria, such as those of the genus Pseudomonas and the genus Alcaligenes.

A preferred combination of antibiotics for preparing solutions in which to dip dressed poultry according to the present invention provides an aqueous solution containing from about 3–30 parts per million of one of the tetracycline antibiotics, preferably chlortetracycline, together with 3–50 parts per million of an antibiotic effective against gram-negative bacteria.

The process of treatment involves the step of contacting dressed poultry with a solution of the antibiotics in the concentrations recommended for a short period of time and thereafter draining away excess solution. Preferably, the dipping solution is chilled and may contain ice in order that the freshly killed birds may be reduced in temperature and the bacterial growth thereon retarded at the earliest possible moment after slaughter. In any event, the dipping should take place prior to the onset of bacterial proliferation.

It is sometimes desirable to add other components to the dipping solution. For example, citric acid or some other non-toxic acid may be employed to reduce the hydrogen ion concentration of the dipping solution to 7.5 or less. Buffers which will accomplish this result may be used in lieu of acids. If the tap water of the area is alkaline pH adjustment may be necessary.

The composition of the present invention will generally be sold as a solid material in the form of a tablet or powder for mixing in specific amounts of water. These compositions may contain materials to assist in their solution or to make it more convenient to measure or weigh out the active ingredients. Sodium chloride, starch, glucose, and various other non-toxic materials may be incorporated with the antibiotic for these purposes.

In view of the very small proportions of antibiotic that is used in the treatment and in view of the heat labile nature of most antibiotics, very little, if any, of the active antibiotic remains in the poultry flesh when it is ready to be consumed.

The term "poultry" as used herein includes the flesh of all edible birds, such as, chickens, turkeys, ducks, geese, squab, and many others wherein the same problem of preservation of the flesh after slaughter is important.

We claim:

1. A method of prolonging the useful shelf life of dressed poultry which comprises the step of immersing freshly dressed poultry into an aqueous solution containing 3–30 parts per million of a broad spectrum antibiotic and 3–50 parts per million of another antibiotic effective against gram-negative bacteria.

2. A method of prolonging the useful shelf life of dressed poultry which comprises the step of immersing freshly dressed poultry into an aqueous solution containing 3–30 parts per million of tetracycline and 3–50 parts per million of another antibiotic effective against gram-negative bacteria of the group consisting of neomycin and polymyxin.

3. A method of prolonging the useful shelf life of dressed poultry which comprises the step of immersing freshly dressed poultry into an aqueous solution containing 3–30 parts per million of chlortetracycline and 3–50 parts per million of another antibiotic effective against gram-negative bacteria of the group consisting of neomycin and polymyxin.

4. A mehod of prolonging the useful shelf life of dressed poultry which comprises the step of immersing freshly dressed poultry into an aqueous solution containing 3–30 parts per million of oxytetracycline and 3–50 parts per million of another antibiotic effective against gram-negative bacteria of the group consisting of neomycin and polymyxin.

5. A method of prolonging the useful shelf life of dressed poultry which comprises the step of immersing freshly dressed poultry into an aqueous solution containing 3-30 parts per million of tetracycline and 3-50 parts per million of another antibiotic effective against gram-negative bacteria of the genus Pseudomonas.

6. A method of treating poultry meat which comprises the step of immersing freshly dressed poultry into an aqueous solution containing 3-30 parts per million of chlortetracycline and 3-50 parts per million of another antibiotic effective against gram-negative bacteria of the genus Pseudomonas.

7. A method of treating poultry meat which comprises the step of immersing freshly dressed poultry into an aqueous solution containing 3-30 parts per million of oxytetracycline and 3-50 parts per million of another antibiotic effective against gram-negative bacteria of the genus Pseudomonas.

8. A composition of matter for the treatment of dressed poultry which comprises a water soluble mixture of a tetracycline antibiotic, another antibiotic effective against gram-negative bacteria, an inert water soluble dispersing agent and a pH adjusting substance, said tetracycline antibiotic being present in amounts ranging from 10% to 90% of the total antibiotic content of the mixture and said other antibiotic also being present in amounts ranging from 10% to 90% of the total antibiotic content of the mixture and said pH adjusting substance being present in amounts to adjust the pH of an aqueous solution to less than 7.5 when the composition is dissolved in water at a concentration of 3 to 30 parts per million of the tetracycline antibiotic.

References Cited in the file of this patent

UNITED STATES PATENTS

| | | |
|---|---|---|
| 2,585,501 | Rusoff et al. | Feb. 12, 1952 |
| 2,766,124 | Upham et al. | Oct. 9, 1956 |
| 2,786,768 | Deatherage | Mar. 26, 1957 |

OTHER REFERENCES

"Food Technology," September 1952, pp. 363 to 366, inclusive.

"Food Technology," July 1953, pp. 282 to 285, inclusive.

"Food Technology," December 1953, pp. 495 to 499, inclusive.